United States Patent [19]
Marocco

[11] Patent Number: 6,089,134
[45] Date of Patent: Jul. 18, 2000

[54] MULTI BLIND TRIM MACHINE

[75] Inventor: Norbert Marocco, Woodbridge, Canada

[73] Assignee: Shade-O-Matic Limited, Toronto, Canada

[21] Appl. No.: 09/361,032

[22] Filed: Jul. 23, 1999

[51] Int. Cl.[7] .............................. B23D 23/00; B23D 1/06; B23D 1/26
[52] U.S. Cl. ................................ 83/197; 83/454; 83/620; 83/628; 83/599; 83/602; 83/694
[58] Field of Search .............................. 83/196, 197, 198, 83/199, 200, 566, 580, 599, 602, 604, 605, 620, 627, 628, 630, 632, 633, 452, 466, 694, 697, 39, 454, 455, 685; 29/24.5

[56] References Cited

U.S. PATENT DOCUMENTS

| | | | |
|---|---|---|---|
| 2,644,520 | 7/1953 | Nelson | 83/198 |
| 2,789,639 | 4/1957 | Lorentzen | 83/198 X |
| 3,391,591 | 7/1968 | Funke | 83/197 |
| 4,457,197 | 7/1984 | Wepner et al. | 83/197 |
| 4,638,703 | 1/1987 | Muhr | 83/518 |
| 5,339,716 | 8/1994 | Sands et al. | 83/452 |
| 5,799,557 | 9/1998 | Wang | 83/639.5 |
| 5,806,394 | 9/1998 | Marocco | 83/197 |
| 5,816,126 | 10/1998 | Pluber | 83/167 |
| 5,927,172 | 7/1999 | Wang | 83/454 |

FOREIGN PATENT DOCUMENTS

| | | | |
|---|---|---|---|
| 0009119 | 1/1981 | Japan | 83/198 |

Primary Examiner—Maurina Rachubo
Assistant Examiner—Boyer Ashley
Attorney, Agent, or Firm—Ohlandt, Greeley, Ruggiero & Perle, L.L.P.

[57] ABSTRACT

A multi-purpose blind cut-down apparatus for cutting a blind having a head rail and closure elements. The cut-down apparatus has a blind holding plate with a blind component opening and a closure element opening for holding the head rail and closure elements in position for cutting. The cut-down apparatus uses a closure element cutting bar moveable relative to the holding plate for cutting the closure elements extending through the holding plate. The cutting bar has an die opening for receiving a cutting die on a cutting die plate. The die opening and cutting die receive the head rail of the blind and cooperate to cut the head rail by moving the cutting die plate relative to the holding plate. The cutting bar moves in a linear path while the die plate moves in an arcuate path, both the cutting bar and die plate are moved by a transmission element moveable relative to the holding plate.

8 Claims, 6 Drawing Sheets

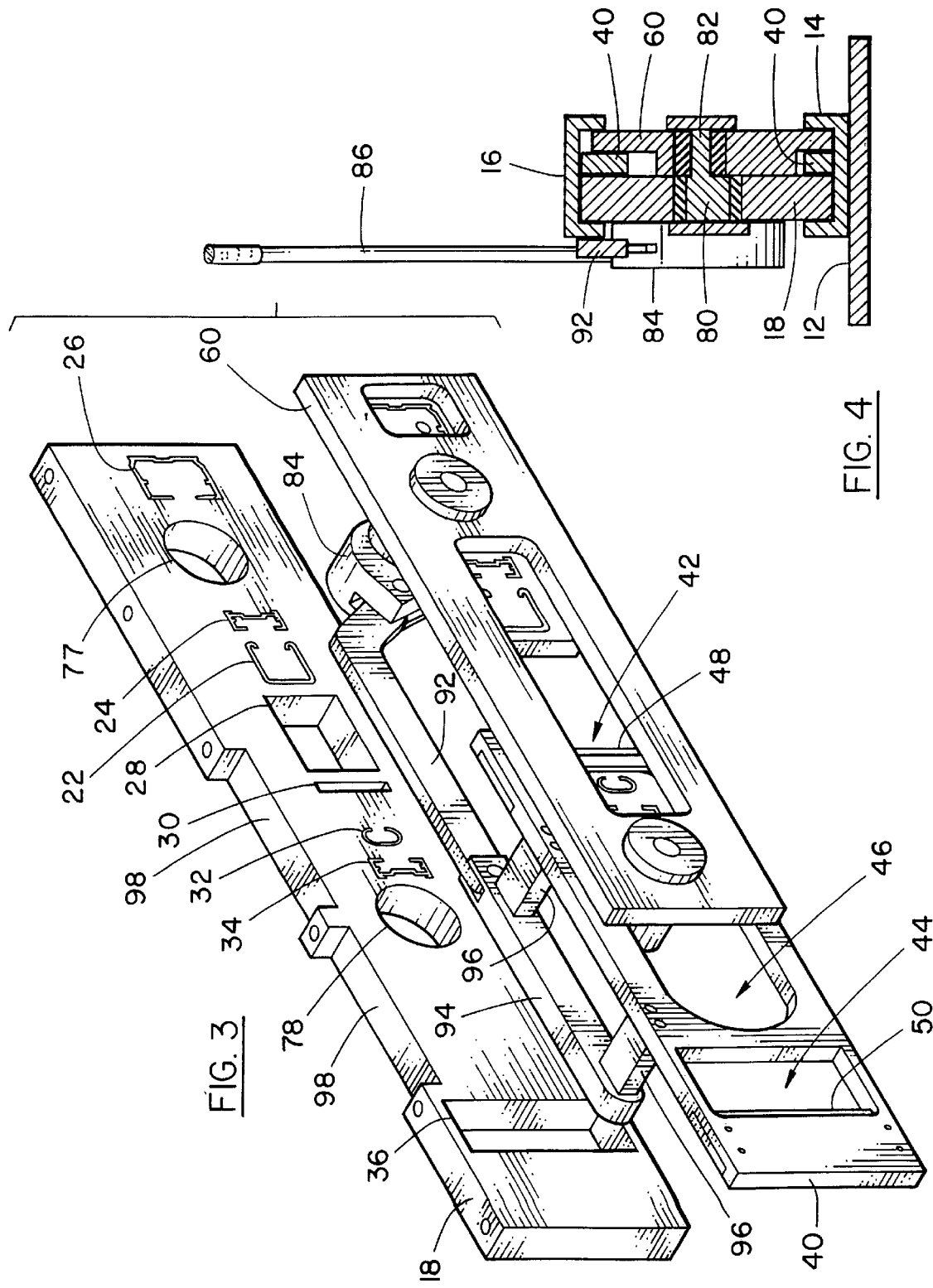

MULTI BLIND TRIM MACHINE

FIELD OF THE INVENTION

The invention relates to a machine for trimming the ends of blinds and window coverings, which may be formed of a variety of different materials.

BACKGROUND OF THE INVENTION

Blinds and window coverings are available in a variety of materials. Venetian blinds are available in which the head and bottom rails are formed of steel, and in which the slats are formed in most cases of aluminium. In other cases slats are formed of other materials such as thermo plastic.

In other cases blinds are available which are formed of fabric, and are folded into pleats, the fabric being secured usually at the top to a head rail typically made of steel. Bottom rails are formed on some blinds of steel and other blinds of other materials.

Such blinds must be fitted to the width, or in some cases the height, of the window or other opening for which they are intended. In the past blinds have been made in a factory, on a custom basis to a particular width specified by the purchaser. A salesperson would usually have had to call on the customer and take an order. However, it is more convenient to manufacture blinds and window coverings in certain standard widths, and stock these standard widths in a retail store. A customer may then simply come into the store and buy a blind slightly wider than the desired width (or longer than the height) and have it trimmed at the ends to the desired width (or height). This is both more economical, and thus more readily saleable, and at the same time provides the customer with an opportunity to purchase blinds in a retail establishment and walk out of the store with them in his possession, rather than meeting a salesperson at home, and waiting a few weeks for them to be fabricated in a factory.

In the past various apparatus has been designed for cutting down widths of blinds of specific designs and specific materials. However, in general terms, these machines have not been totally suitable for cutting down blinds of a variety of different materials.

In addition to these factors, blinds and window coverings are also available in which blind slats are suspended vertically from a head rail. These blind slats may be drawn to one side or the other of the window opening, or in some cases to both sides, and may be rotated between open and closed positions, by a mechanism located in the head rail. Again, these blinds usually required a sales call, at the home, followed by custom fabrication in a factory.

Advantageously, these blinds too would be provided in standard widths, in a retail store and it would be desirable to provide an apparatus in the store for cutting down the width of the head rail and also the lengths of the vertical slats. Preferably, in order to economize in-store installations of cut-down equipment and also to simplify instruction of staff, a single cut-down machine will be provided which enables a greater variety of different types of blinds to be cut down to the desired width (or height).

One of the considerations in designing such a multi-purpose cut-down machine is the manual effort that is required to operate the machine to cut through the various different materials.

Clearly, steel used in head rails, is relatively hard to cut. On the other hand, since the sections used in this type of product are relatively thin, the die for cutting the steel components of the blind may only be required to move a short distance.

Consequently, so long as adequate leverage is provided to move the steel cutting die a relatively short distance, this problem can be addressed.

On the other hand, the cutting of the blind slats themselves presents entirely different problems. The slats are usually made of relatively soft material which is easy to cut, and requires less manual effort. On the other hand, the thickness of all of the blind slats when bundled together for cutting is considerable. Consequently, the die for cutting the blind slats must move a considerable distance.

While it is relatively easy to provide for the manual operation of such a die moving a considerable distance for cutting easier to cut materials, the problem becomes more complex when it is understood that it is desirable to cut all of the materials in what is essentially a single cutting stroke.

This is because the trimming of the ends of the blinds must in most cases be carried out, so that the blind has a precisely measured width along each side, and the widths of the blind slats correspond to the widths of the head rail and bottom rail.

It is not feasible to provide two machines one which cuts only the head rail and the bottom rail, which are usually made of steel, and a second machine for an entirely separate cut for cutting the blind slats or blind material in the case of a pleated shade.

The moving of the blind from one machine to another will almost inevitably result in some discrepancy between the amount cut off from the head rail and the amount cut off from the blind slats or fabric, and the end result will not be satisfactory.

For these reasons therefore the provision of a multi-purpose cutdown machine meeting all of these objectives, i.e. being capable of cutting through both the thick bundle of softer blind slats or shade, and the harder but thinner metal head rail and bottom rail, in a single manual cutting movement, and being adaptable to blinds of varying materials, presents a complex problem.

The complexity of the design is further aggravated by the fact that the head rail is located at the head of the blind and the bottom rail is located at the bottom rail of the blind, both usually made of steel, and the blind slats or blind fabric are located between the head rail and the bottom rail. Consequently, when trimming the blind it is necessary to provide cutting dies for cutting both the head rail and the bottom rail, which are spaced apart from one another, and for substantially simultaneously cutting the blind slats or blind fabric (referred to herein as closure "closure elements") located between the head rail and bottom rail. It will of course be appreciated that in the case of horizontal, i.e. Venetian blinds or fabric blinds, all of these cuts must be made in a common plane, so as to provide a uniform end trimming function on the blind. Even for vertical blinds, the vertical blind slats must be trimmed, along their lower ends, by cutting all the slat ends along a common plane.

BRIEF SUMMARY OF THE INVENTION

With a view to providing a cutdown apparatus which addresses the various foregoing conflicting problems, the invention comprises a multi-purpose blind cutdown apparatus for cutting a blind having at least a head rail component, and closure elements suspended from the head rail, and comprising a blind holding plate having at least a blind component opening and a closure element opening formed therein for receiving respective components and elements of a blind there through, and holding them in position for cutting, a closure element cutting bar moveable relative to said holding plate (and defining an opening), and carrying closure element cutting means for cutting blind closure elements extending through said holding plate, a cutting die plate adjacent to said cutting bar, said cutting die plate carrying at least one cutting die for receiving said blind at least one component there through, and being moveable relative to said holding plate for cutting at least one said component, and wherein said cutting die on said cutting die plate extends through said opening formed in said closure element cutting bar, and including movement means for moving said closure element cutting bar and said cutting die plate substantially simultaneously, whereby both said closure elements and said blind components may be cut substantially simultaneously along the surface of said holding plate.

The invention further provides that the holding plate defines a transmission recess, and including transmissions means connected with said movement means, said transmission means extending through said transmission recess in said holding plate, and being secured to said cutting bar.

The invention further provides that the movement means are mounted on the holding plate, and are rotatable relative thereto, and including die plate drive means mounted offset relative to the rotational axis of the movement means, and extending through drive openings formed in the cutting bar, whereby movement may be transmitted both to the cutting bar and to the die plate simultaneously by rotation of said movement means.

The invention further provides that the transmission connecting between the cutting bar and the movement means is pivotally mounted to said movement means at a point radially offset from the central axis of the movement means a predetermined radial distance, and wherein the drive means for driving the die plate define a drive axis which is radially offset relative to the rotational axis of the movement means, by a radial distance which is less than the radial offset of said pivotal connection of said transmission means, whereby the movement path of said cutting bar is greater than the movement path of said die plate.

The invention further provides that the holding plate shall define at least a head rail opening, a blind closure element opening, and a bottom rail opening, and, in a further embodiment shall define a first blind closure element opening and a second blind closure element opening, said second blind closure element opening being smaller than said first blind closure element opening.

The invention further provides that the cutting bar shall define a movement path which is linear, and wherein said die plate shall define a movement path which is arcuate.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

FIG. 3 is an exploded perspective illustration of the holding plate, the cutting bar and the die plate;

FIG. 4 is a section along the line 4—4 of FIG. 1;

DESCRIPTION OF A SPECIFIC EMBODIMENT

Figure 1:
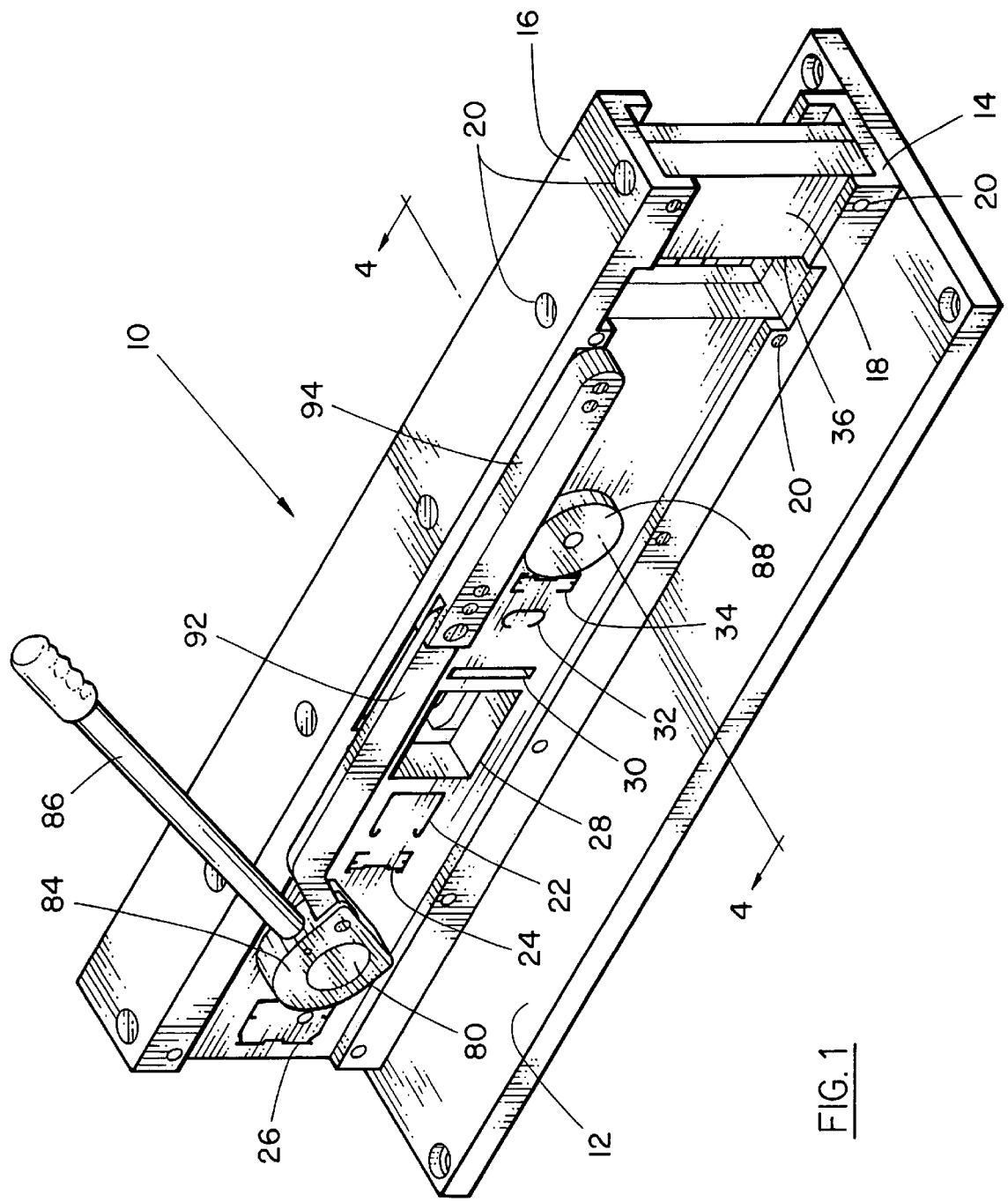
FIG. 1 is an upper perspective illustration illustrating a multi-blind cut down apparatus illustrating a preferred form of the invention.
Figure 2:
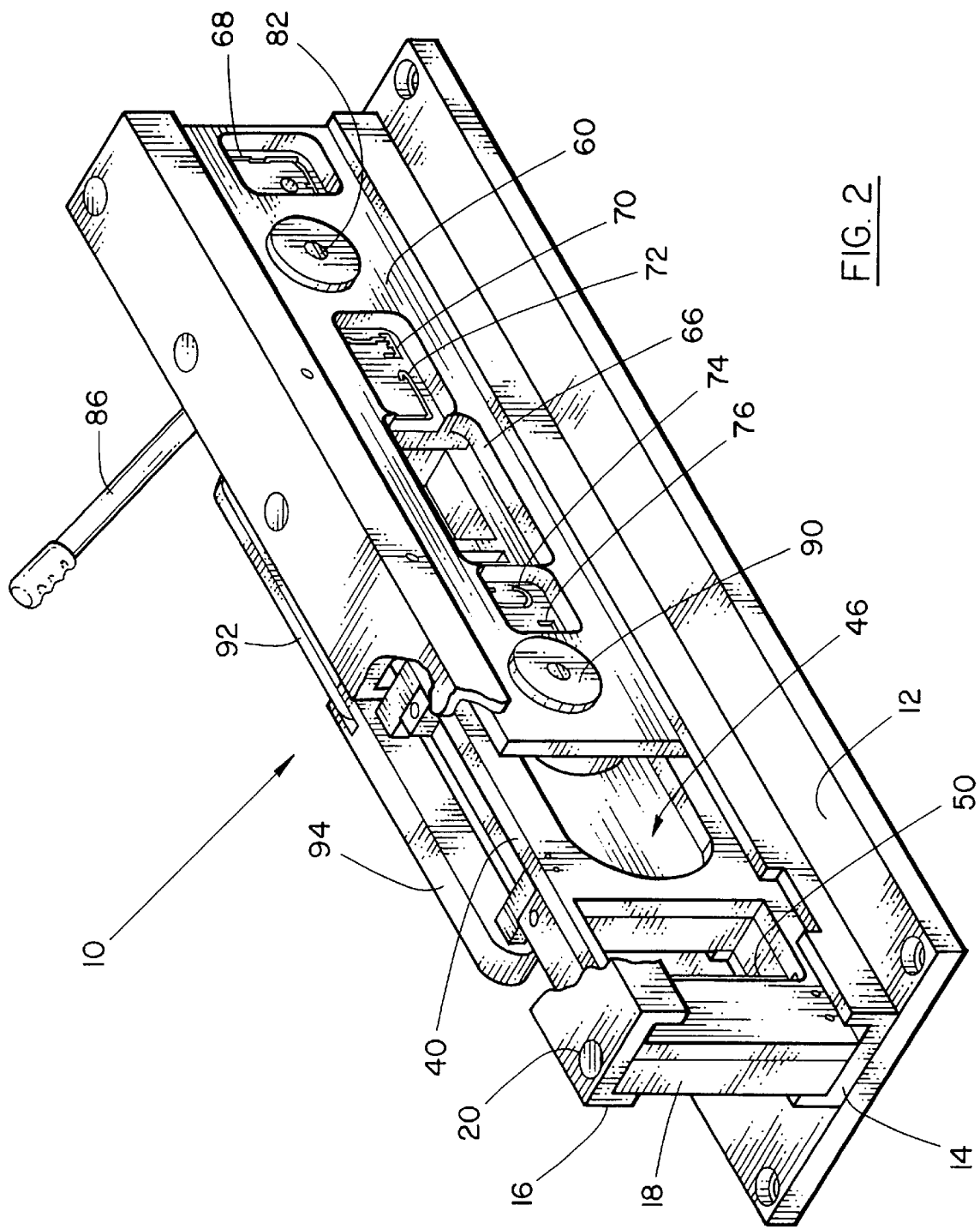
FIG. 2 is an upper perspective illustration of the same apparatus as FIG. 1, shown from the opposite side.

Referring first of all to FIGS. 1 and 2, the invention is there illustrated in the form of a multi-blind cut down apparatus indicated generally as 10. The apparatus illustrated is designed for cutting down blinds consisting of either a head rail, and a fabric portion such as a pleated blind which forms the closure element. Alternatively the apparatus will cut down a conventional Venetian blind consisting of a head rail, a plurality of closure elements or slats and a bottom rail. The apparatus can also be used for cutting down and trimming a vertical blind consisting of a head rail and vertical slats. Thus the apparatus is adaptable to a wide variety of different types of blinds and closure elements and materials.

The purpose of the apparatus is that it may be installed in a retail store or blind outlet. The store will stock blinds in various standard widths, or in the case of vertical blinds lengths. Customers will then come in having measured the blind opening and will specify the dimensions of the blind to be purchased. The personnel in the retail store will then select the appropriate blind and trim it to the appropriate dimensions and supply it to the customer while he waits or at least, only with a brief delay.

The entire process therefore of satisfying a customer's needs is speeded up as compared with the former practice in which sales persons would make a call on the premises of the customer, take measurements and then order blinds of specific dimensions from a factory.

In order to provide for these various functions, the apparatus illustrated will be seen to comprise a base plate 12, and a pair of lower and upper channels 14 and 16. Extending between the upper and lower channels 14 and 16, a fixed holding plate 18 is provided. Plate 18 is secured in position by means of any suitable fastenings or threaded devices indicated generally as 20.

Thus plate 18 is fixed relative to the base 12 and the channels 14 and 16. Plate 18 is formed in this particular embodiment with a plurality of different openings for receiving different blind components and closure elements. Thus holding plate 18 is provided with a first head rail opening 22, of rectangular shape for typically receiving the head rail of a Venetian blind or a blind having closure elements formed of folded or pleated fabric. Such blinds are not illustrated but are well known in the art and require no special description. A second head rail opening 24 is provided, for receiving a head rail of a different type of blind, or for example a head rail of a vertical blind. A third head rail opening 26 is provided, for receiving the head rail of a further type of blind.

In addition to the various head rail openings illustrated, other head rail openings may be provided if desired for other types of blinds, the three types of head rail openings illustrated, being merely shown by way of example and without limitation.

Closure element openings are provided namely a first closure element opening 28, for receiving typically a plurality of closure elements for example from a Venetian blind or for receiving the multiple folds of closure elements from a typical fabric or pleated blind. A second closure element opening 30 is provided adjacent to the larger closure element opening 28 for reasons to be described for receiving a lower most closure element typically of a Venetian blind. A first bottom rail opening 32 is provided for receiving bottom rail openings typically for cutting bottom rails of Venetian blinds although other forms of blinds may have bottom rails.

A second bottom rail cutting opening 34 is provided for different types of blinds. Spaced from the remaining openings, a further closure element opening 36 is provided. Typically this will be for cutting closure elements of blinds having, for example, vertical slats. Usually such blinds have slats which are of greater width than the width of, for example, the Venetian blind slats and thus a separate opening is required for such blind slats.

It will thus be seen that in the illustrated embodiment a provision is made for a wide variety of different head rails and a wide variety of different closure elements.

Mention may be made briefly of the use of the particular location of the Venetian blind head rail opening 22 and the main slat opening 28 and the single slat opening 30 and the bottom rail opening 32.

In a typical Venetian blind the head rail, slats and bottom rail are all preassembled on ladder tapes (not shown), such as are well known in the art, in the factory before they are shipped out. The slats are thus located a predetermined distance apart from one another and although they can be closed up and sandwiched together they cannot be spread apart more than the distance allowed by the ladder tapes.

In order to facilitate the cutting of the head rail of such a Venetian blind which is usually made of sheet metal and the bottom rail which is also usually made of sheet metal although it may be made of extruded plastic, which are located at the top and bottom of the blind, and the simultaneous cutting of the blind slats, which are located between the head rail and the bottom rail, it has been found to be particularly convenient, in accordance with the invention, to provide for the head rail opening 22 and the bottom rail opening 32 to be spaced apart a substantial distance. As will be understood however, due to the restrictions imposed by the ladder tapes, at least the first blind slat below the head rail, can be only displaced away from the head rail opening, by a distance equal to the spacing defined by the ladder tapes. Similarly, at the bottom end of the blind, the spacing between the bottom blind slat and the bottom rail is restricted by the length of the ladder tapes.

In order to accommodate these restrictions, and to facilitate this, the wide first blind closure element opening 28 is provided and spaced along side it the second smaller blind closure element opening 30 is provided. This enables the insertion of the various blind closure elements and the head rail and bottom rail, in a convenient manner, without straining the ladder tapes, and without producing distortion or damage to the blinds themselves.

Figure 6:
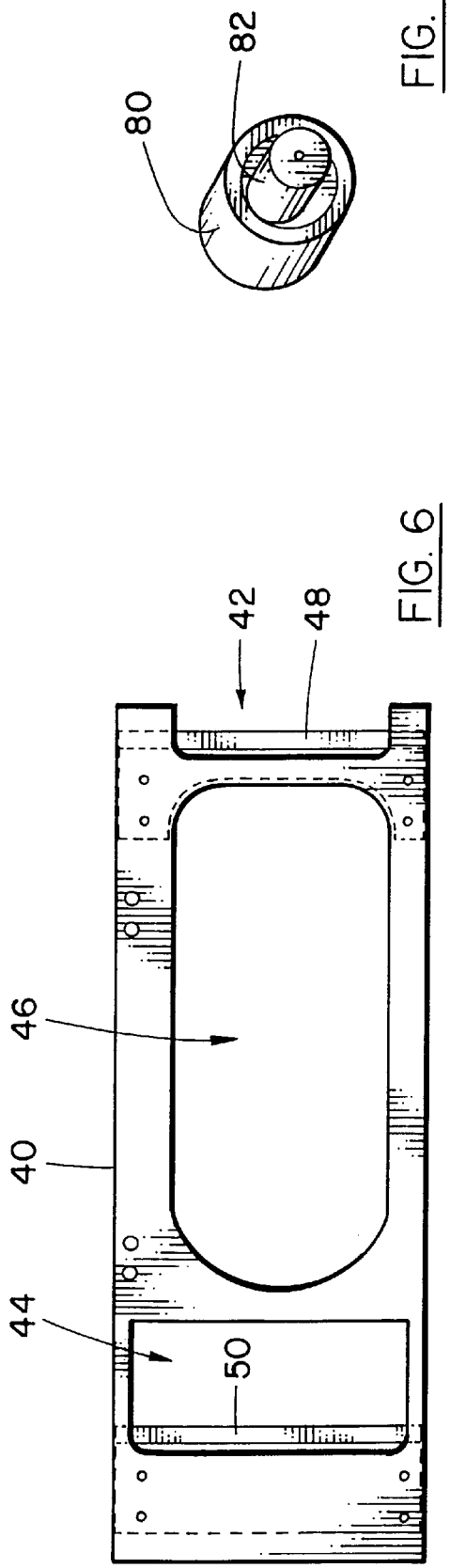
FIG. 6 is a side elevational view of the cutting bar.

Reference will now be made to FIGS. 2 and 3 in particular. In these drawings, the cutting bar and the die plate are illustrated in relation to the holding plate 18. The blind closure element cutting bar is indicated generally as 40 and is located along side the inwardly facing surface of the holding plate 18 and is slidable along that surface which defines a cutting plane for procuring trim cuts of the various blind elements along the common plane. The blind element cutting bar 40, is shown in isolation in FIG. 6. The cutting bar 40, which in this embodiment is in the form of a partial plate, comprises a first cutting recess 42 and a second cutting recess 44 spaced apart from one another. Between the two cutting recesses a drive transmission recess 46 is formed for reasons to be described below.

Within the first cutting recess 42 which in this embodiment is simply an open generally U-shaped recess, there is provided a first cutting blade 48, and in the second cutting recess 44 there is provided a second cutting blade 50.

The cutting blades 48 and 50 are releasably mounted on the cutting bar 40, so that they may periodically be resharpened or remade and then reinserted.

Figure 8:
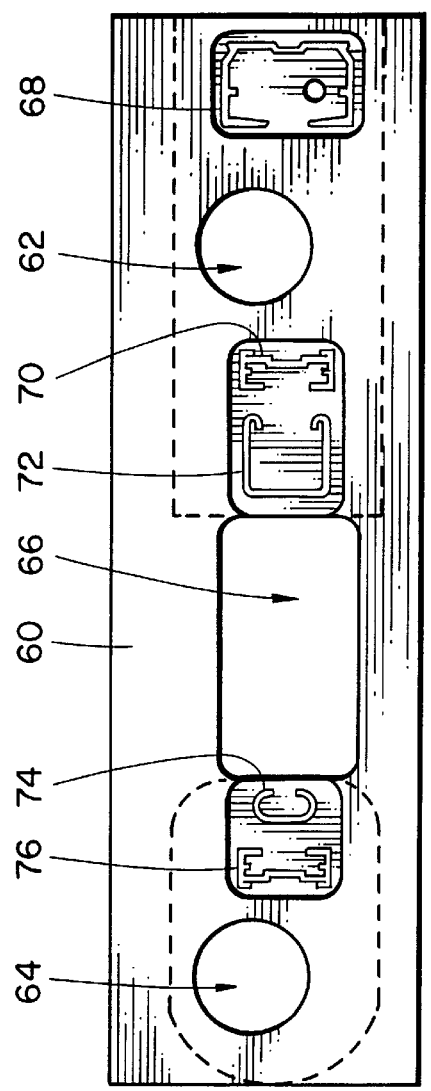
FIG. 8 is a side elevational view of the die plate.
Figure 9:
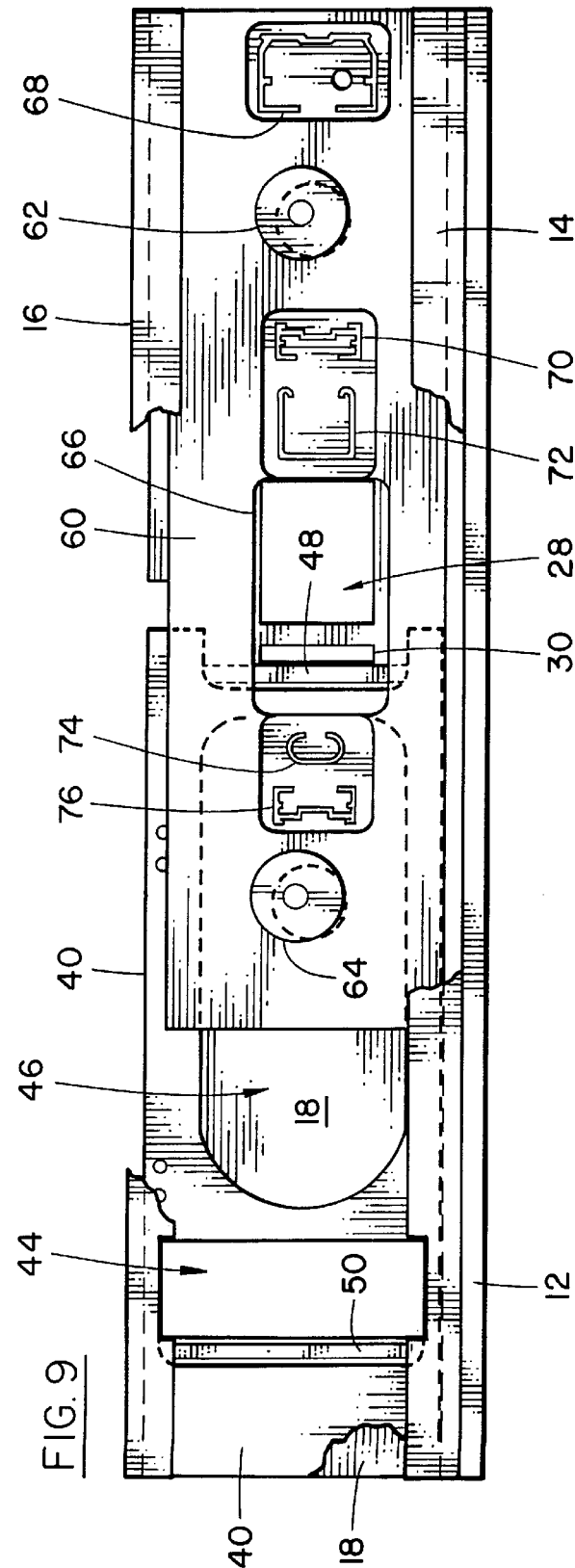
FIG. 9 is a side elevational view of the apparatus partially cut away, and showing a first position of the components.
Figure 10:
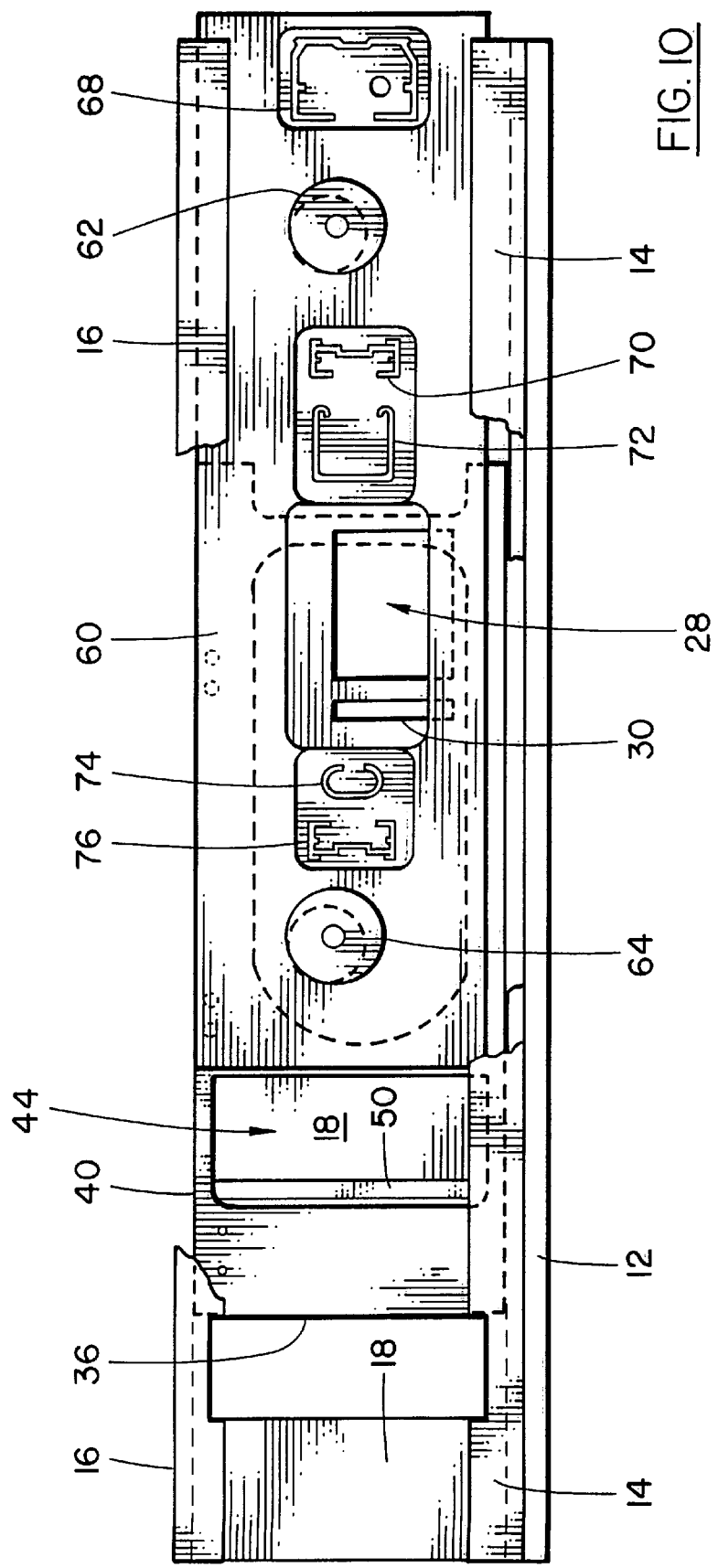
FIG. 10 is a side elevational view corresponding to FIG. 9 showing a second position of the components.

The die plate is indicated generally as 60 (FIG. 8). It is slidably received between the lower channel 14 and the upper channel 16, and is sandwiched against the blind cutting bar 40, so that the two slide alongside on another.

The cutting die plate 60 is provided with first and second plate drive recesses 62, 64, which are circular and are spaced apart along the length of plate 60. A closure element opening 66 is provided in plate 60, registering with closure element opening 28 in holding plate 18.

In order to cut the various head rails and bottom rails, which may be inserted through the various openings 22, 24, 26, 32, and 34, cuffing dies are mounted in plate 60, which comprise a first head rail cuffing die 68, a second head rail cuffing die 70, a third head rail die 72, a first bottom rail cuffing die 74 and a second bottom rail cuffing die 76. All of these cuffing dies 68 to 76 are mounted on the plate 60 in respective recesses, so that the actual cutting dies themselves extend beyond the inside surface of the plate 60 (FIG. 4).

The cuffing dies 68, 70 and 72, extend into the plane of the surface of the blind cuffing bar 40, which abuts against the inside surface of the holding plate 18. The dies 68, 70 and 72 are all located ahead of the blade 48, and therefore there is no interference between them. However, dies 74 and 76 are mounted so as to extend through opening 46 in bar 40, so that opening 46 allows adequate space for the bar 40 to slide to and fro cuffing the closure elements, without interfering with the dies 74 and 76.

This feature enables all of the head rails, bottom rails and closure elements to be cut in a common plane, and to be cut simultaneously, or at least with all of the blind components, both head rails, bottom rails and closure elements, being located in the holding plate 18 at the same time. This produces the most advantageous result in practice, and enables the ends of blinds, typically Venetian blinds, but also in other forms of window coverings, to be trimmed down each side edge, so as to produce the desired amount of end trim on all components equally.

In accordance with the invention, provision is made for moving both the closure element cutting bar 40 and the die plate 60, simultaneously, or at least, in close sequence one after the other, so that all of the blind components, both the various head rails and bottom rails and also the closure elements, can all be inserted into the holding plate and be cut in a common plane.

Before describing the movement means in detail, it will be understood that the cutting bar 40 is moved along a linear path, within the lower and upper channels 14 and 16. The die cutting plate 60 is moved along a path which is partly arcuate, within the channels 14 and 16. This produces certain advantages in cutting of the various metallic components which pass through either opening 68, 70, 72, 74 or 76.

It will be appreciated that these openings are oriented in an essentially perpendicular fashion, and that if it was attempted to cut all of these components with a linear horizontal motion, the cutting dies would be obliged to cut a relatively great length of metal, at least in the initial movement. By causing the die plate 60 to move in an arcuate fashion, the cuffing of the metal blind components is more progressive, and will start at one corner of each component, so that less manual effort is required, and there is less chance of distortion.

Figure 5:
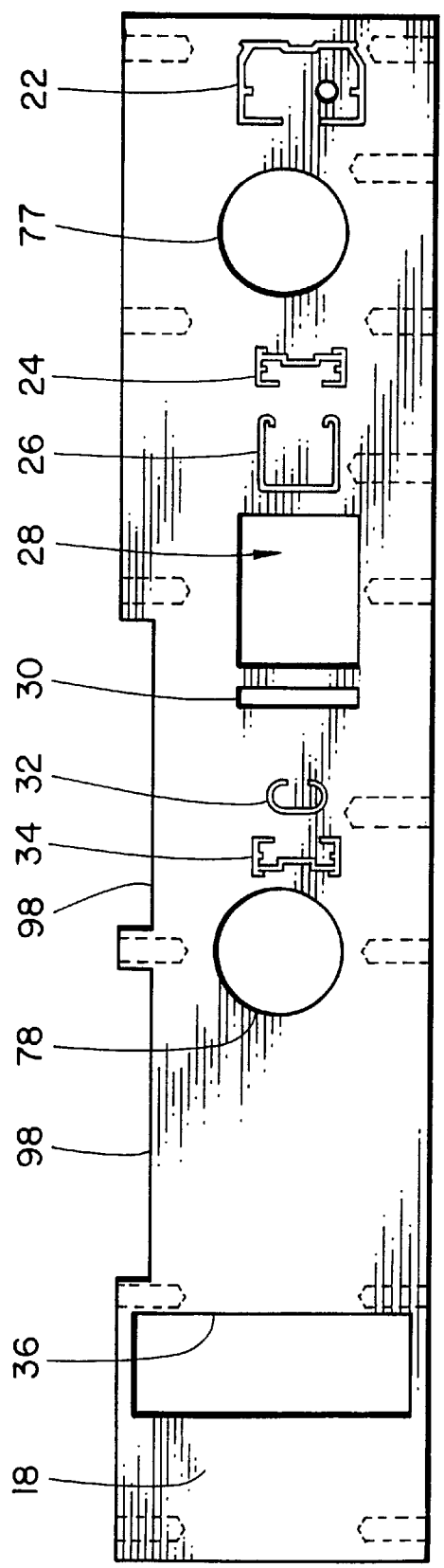
FIG. 5 is a side elevational view of the inside facing surface of the holding plate.
Figure 7:
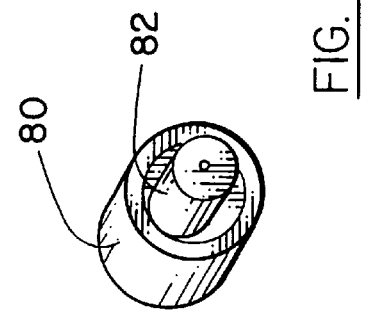
FIG. 7 is a perspective illustration of the die plate drive means.

The holding plate 18 is provided with first and second drive recesses 77 and 78 (FIG. 5). Within recess 77 there is mounted a rotary drive boss 80 (FIG. 7). Drive boss 80 is attached to an off set drive pin 82, the purpose of which will be described below.

Drive boss 80 is extended away from holding plate 18, and is operatively coupled to a drive collar 84, which in turn is connected to a manual lever 86 (FIG. 1).

In order to procure a controlled arcuate movement of die plate 60, a secondary idler drive boss 88 is mounted in opening 78 in the holding plate 18 (FIG. 1). Idler boss 88 incorporates an idler control pin 90 and looks essentially the same as the boss 80 and 82 (FIG. 7).

Drive collar 84 is coupled by means of a transmission lever 92, to a common drive bar 94. Bar 94 is connected at spaced apart intervals by means of blocks 96 to blind component cutter bar 40. Holder plate 18 is provided with cutaway notches 98—98 to receive blocks 96 there through.

Drive pin 82 on boss 80 extends into drive recess 62 in plate 60. Idler pin 90 on boss 88 extends into recess 64 in plate 60.

Thus when the drive collar 84 is rotated by manually pulling lever 86, boss 80 will rotate and due to the coupling of plate 60 between the two drive pins 82 and 90, boss 88 will also rotate. This will cause the plate 60 to move in a semi arcuate fashion within channels 14 and 16. At the same time, the operation of the collar 84 and lever 86 will cause the transmission 92 to drag the bar 94 towards the collar 84. This will cause movement of the cutting bar 40 in a linear fashion.

It will thus be seen that both the cutting bar 40 and the cutting die plate 60 are moved in this case substantially simultaneously, while the die plate moves in a semi arcuate path, and the cutting bar moves in a linear path.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A multi-purpose blind cut-down apparatus for cuffing a blind having at least a head rail component, and closure elements suspended from the head rail, and comprising:
    a blind holding plate having at least one blind component opening and a closure element opening formed therein for receiving respective blind components and the closure elements of the blind therethrough and holding them in position for cutting;
    a closure element cutting bar moveable relative to the holding plate;
    a closure element cutting means on the cutting bar for cutting blind closure elements extending through the holding plate;
    a die opening means in the cutting bar;
    a cutting die plate adjacent to the cutting bar, the cutting die plate defining opening means and carrying at least one cutting die for receiving the at least one blind component therethrough, the die plate being moveable relative to the holding plate for cutting the at least one blind component, wherein the cutting die on the cutting die plate extends through said die opening means formed in the closure element cutting bar, so as to make all cuts in a common plane.

2. A multi-purpose blind cut-down apparatus as claimed in claim 1 wherein movement means are provided for moving both the closure element cutting bar and the cutting die plate whereby both the closure elements and the blind components are cut along a surface of the holding plate.

3. A multi-purpose blind cut-down apparatus as claimed in claim 2 wherein the holding plate defines a transmission recess including transmission means connected with the movement means, the transmission means extending through the transmission recess in the holding plate and being secured to the cutting bar.

4. A multi-purpose blind cut-down apparatus as claimed in claim 3 wherein the movement means are mounted on the holding plate and are rotatable relative thereto and including die plate drive means mounted offset relative to a rotational axis of the movement means and extending through drive openings formed in the cutting bar, whereby movement are transmitted both to the cutting bar and to the die plate by rotation of are movement means.

5. A multi-purpose blind cut-down apparatus as claimed in claim 4 wherein the transmission means connecting between the cutting bar and the movement means is pivotally mounted to the movement means at a point radially offset from a central axis of the movement means a predetermined radial distance, and wherein the drive means for driving the die plate defines a drive axis which is radially offset relative to the rotational axis of the movement means, by a radial distance which is less than the radial offset of the pivotal connection of the transmission means, whereby a movement path of said cutting bar is greater than a movement path of the die plate.

6. A multi-purpose blind cut-down apparatus as claimed in claim 1 wherein the holding plate defines at least a head rail opening, a blind closure element opening, and a bottom rail opening.

7. A multi-purpose blind cut-down apparatus as claimed in claim 1 including a first blind closure element opening and a second blind closure element opening, the second blind closure element opening being smaller than the first blind closure element opening.

8. A multi-purpose blind cut-down apparatus as claimed in claim 1 wherein the cutting bar defines a movement path which is linear, and wherein the die plate defines a movement path which is arcuate.

\* \* \* \* \*